United States Patent [19]

Kuwana

[11] 4,078,862
[45] Mar. 14, 1978

[54] APPARATUS FOR PRODUCING A COMPOSITE COPY OF AN ORIGINAL DOCUMENT AND SELECTIVELY POSITIONED SUPPLEMENTAL DOCUMENTS

[75] Inventor: Toshiji Kuwana, Tokyo, Japan

[73] Assignee: Rank Xerox Ltd., London, England

[21] Appl. No.: 750,054

[22] Filed: Dec. 13, 1976

[30] Foreign Application Priority Data

Dec. 26, 1975 Japan .............................. 50/154726

[51] Int. Cl.² ...................... G03B 27/52; G03B 27/62
[52] U.S. Cl. .......................................... 355/40; 355/75
[58] Field of Search ....................... 355/39, 40, 77, 79, 355/95, 96, 75, 74

[56] References Cited

U.S. PATENT DOCUMENTS

| | | | |
|---|---|---|---|
| 3,264,106 | 8/1966 | Alldis | 355/79 X |
| 3,642,370 | 2/1972 | Meredith et al. | 355/75 |
| 3,721,173 | 3/1973 | Jaffe | 355/75 |
| 3,880,521 | 4/1975 | Eppe et al. | 355/75 X |
| 3,913,118 | 10/1975 | Abrams | 355/79 X |
| 3,990,794 | 11/1976 | Nittmann | 355/75 |
| 4,009,954 | 3/1977 | Ritzerfeld | 355/40 X |

Primary Examiner—Donald Griffin
Attorney, Agent, or Firm—James J. Ralabate; Franklyn C. Weiss; Allen S. Melser

[57] ABSTRACT

Apparatus for producing copies of portions of an original document and at least one selectively positioned supplemental document which masks the portion of the original document not reproduced. A copier with an image receiving station is provided. A holding device positions the original document into operative association with the image receiving station. The supplemental documents are placed in a transparent over-lay which is positioned between the holder and the image receiving station. The set-up is such that the supplemental documents are in a position to be reproduced while preventing the corresponding portions of the original document masked by the supplemental documents from being reproduced. A transfer device moves the holding device in a reciprocating motion to place the supplemental documents and the original document in first and second relative positions during first and second copy cycles, respectively.

8 Claims, 7 Drawing Figures

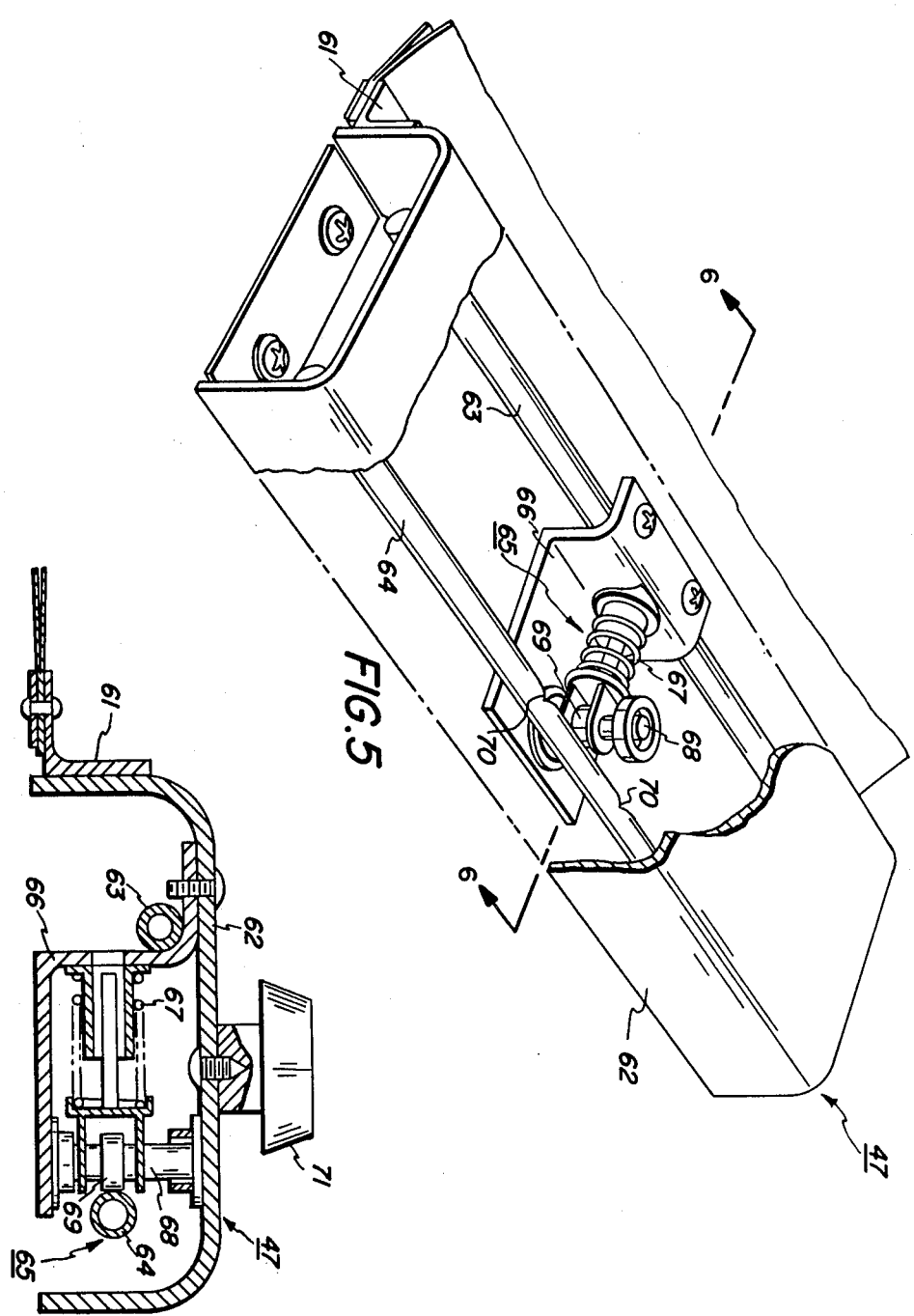

APPARATUS FOR PRODUCING A COMPOSITE COPY OF AN ORIGINAL DOCUMENT AND SELECTIVELY POSITIONED SUPPLEMENTAL DOCUMENTS

BACKGROUND OF THE INVENTION

This invention relates to copying in general and to producing copies of portions of an original document and at least one selectively positioned supplemental document which masks the portion of the original document not reproduced in particular.

In order to provide goods and services to their customers, large business entities must also provide numerous departments within the business organization with paper work relating to the filling of orders, inventory control, movement and shipment of goods, etc. Take for example a department store. Normally a customer places an order either in person or by telephone with a department designated to take such orders. The individual taking the orders normally fills out a form containing various columns and rows of information denoting the description of the goods to be delivered, the department taking the order, as well as the name, address, and telephone number of the person who will receive the goods.

From the original, copies are made and circulated to each of the departments concerned such as for order collection, shipping, or the like. It is often necessary to supplement the original order form with additional information after an order has been taken, but before distribution copies are made. The present method for producing a composite copy of the original order form and the additional information contained on supplemental documents requires a time consuming process involving the manual positioning and repositioning of the documents during the reproduction cycle.

SUMMARY OF THE INVENTION

The present invention provides an efficient and novel method for producing copies for use in an order control system. In particular, the present invention provides a system for producing copies of portions of an original document and at least one selectively positioned supplemental document which masks the portion of the original document not reproduced. A copier with an image receiving station is used. A holding device positioned to the original document into operative association with the image receiving station. The supplemental documents are placed in a transparent overlay which is positioned between the holder and the image receiving station. The set up is such that the supplemental documents are in a position to be reproduced while preventing the corresponding portions of the original document masked by the supplemental documents from being reproduced. A transfer device moves the holding device in a recipating motion to place the supplemental document and the original document in first and second relative positions during first and second copy cycles, respectively.

It is an object of the present invention to provide a system for producing copies of portions of an original document and at least one selectively positioned supplemental document which masks the portion of the original document not reproduced.

It is a further object of the present invention to provide a method of reproduction capable of efficiently reproducing copies from originals of order forms for circulation to each concerned department within an organization.

Other objects and advantages of the present invention will further become apparent hereinafter and in the drawings, in which:

BRIEF DESCRIPTION OF THE DRAWINGS

FIG. 5 is a perspective view partially cut away of a preferred embodiment of the original transfer device;

FIG. 6 is a cross-sectional view of the original transfer device taken along line 6—6 in FIG. 5.

DESCRIPTION OF THE PREFERRED EMBODIMENT

Figure 1:
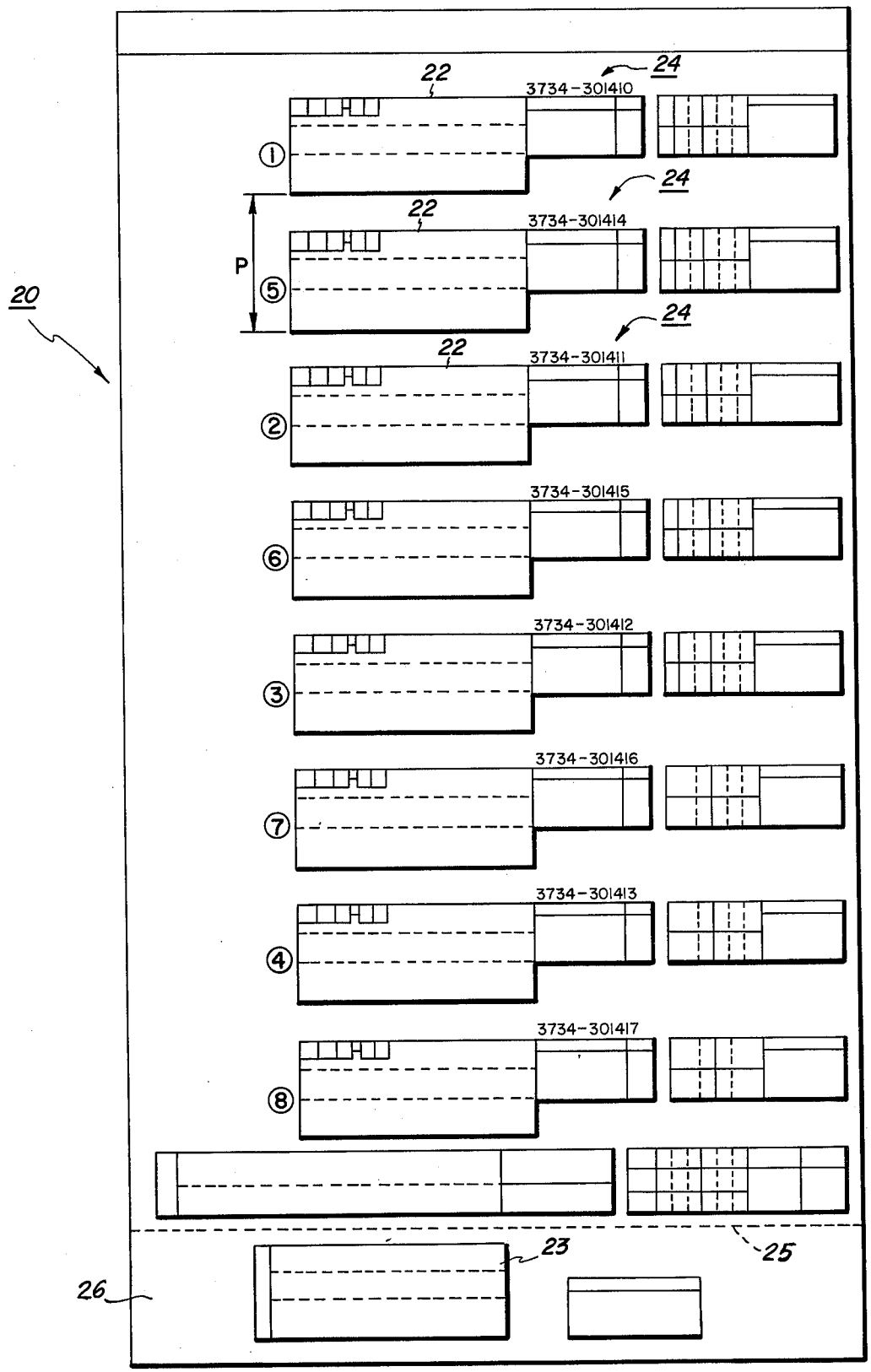
FIG. 1 is a plan view of an order form used in the present invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in the similar manner to accomplish a similar purpose.

Figure 2:
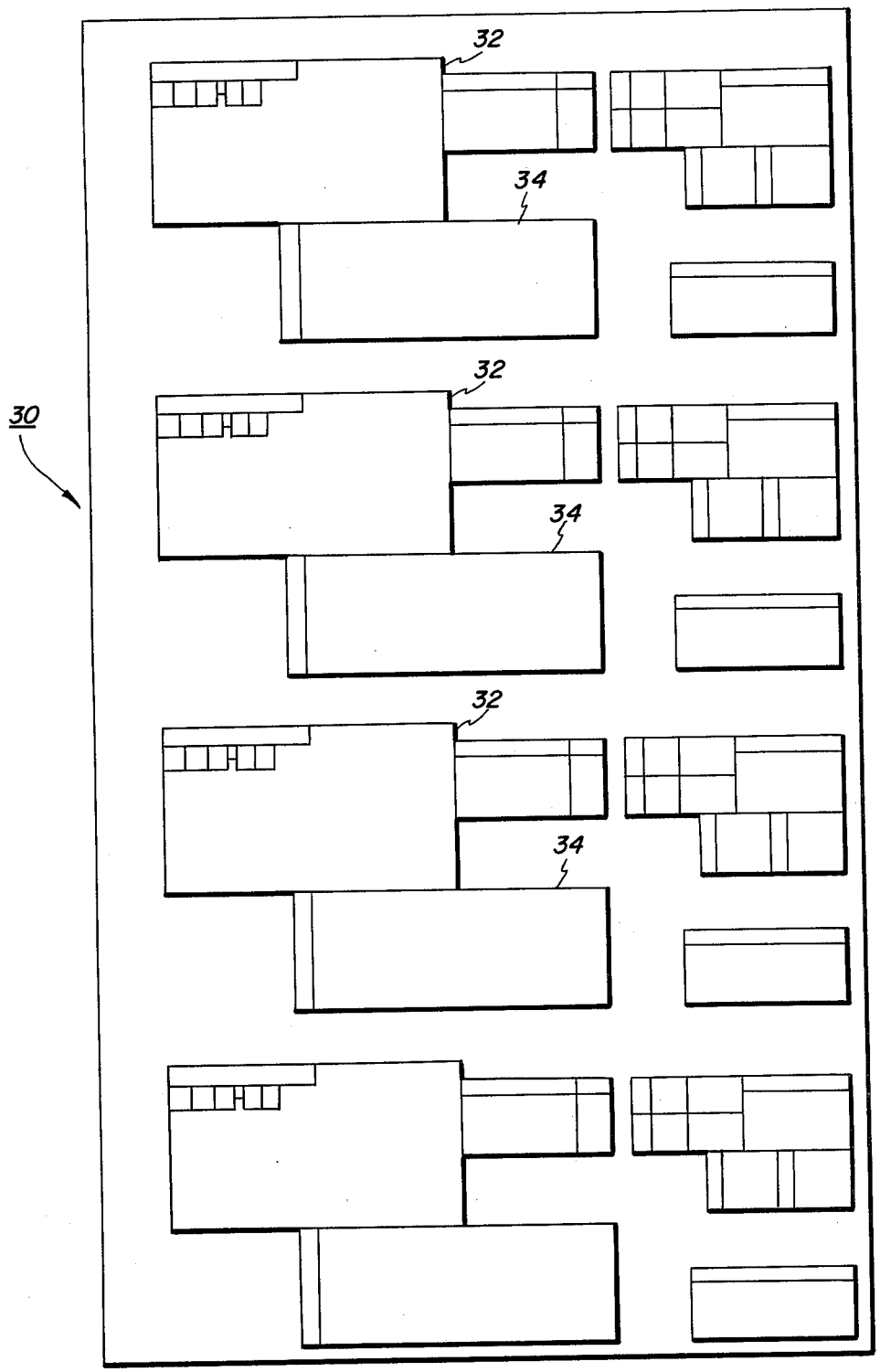
FIG. 2 is a plan view of a copying sheet used in the present invention.

In FIG. 1, reference numeral 20 denotes an order form for receiving names and addresses of the ultimate user of the goods/services requested. The form consists of two sheets, that is, an original document and a customer's copy. When necessary data such as names, addresses and telephone numbers are written in destination columns 22 of an original, they are duplicated on a customer's copy made of non-carbon paper or the like. On the form 20, as shown in FIG. 1, eight columns 22 are arranged at equal predetermined distances P in which every other column 22 starting from the first column is numbered as 1, 2, 3 and 4, while other columns starting from the second column 22 are numbered as 5, 6, 7 and 8. Each column at the top carries a reference number 24 to be read by a photoelectric reader or similar device. The order form 20 has at the lower end thereof an ordering department column 23 in which is to be written the address, name, telephone number and the like of the department placing the order. This column is attached separably by way of a perforated line 25 defining a supplemental document 26. Reference numeral 30 in FIG. 2 represents a copy form for duplicating the contents of the order form 20 and it has printed thereon four destination columns 32 successively from the head of the paper which correspond respectively to the positions of the destination columns 22 on the order form 20, and also four ordering department columns 34 each between two destination columns 32 and belonging to the destination column 32 just above. The copying forms are stacked in pairs of two sheets depending on the number of departments to which they are to be circulated.

Figure 3:
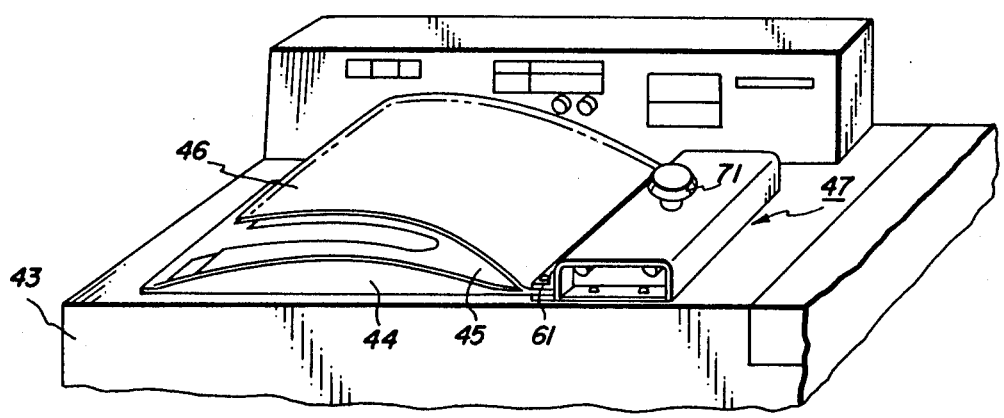
FIG. 3 is a partial, perspective view of a reproduction device using the present invention.
Figure 7:
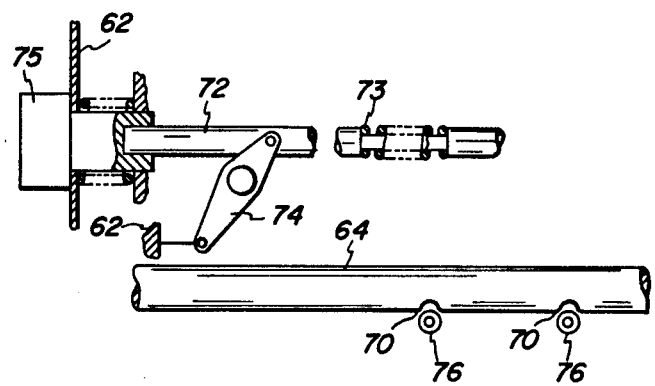
FIG. 7 is a partial schematic view of a preferred embodiment of the automatic control used to move the original transfer device.

A manner of reproducing an order form 20 onto a copy form 30 is shown in FIG. 3. A reproduction machine 43 has an arc-shaped image receiving station 44 which may of course be flat. On the station 44, is mounted an over-lay 45. Numeral 46 denotes an original document holding device which is connected to an original transfer device 47.

Figure 4:
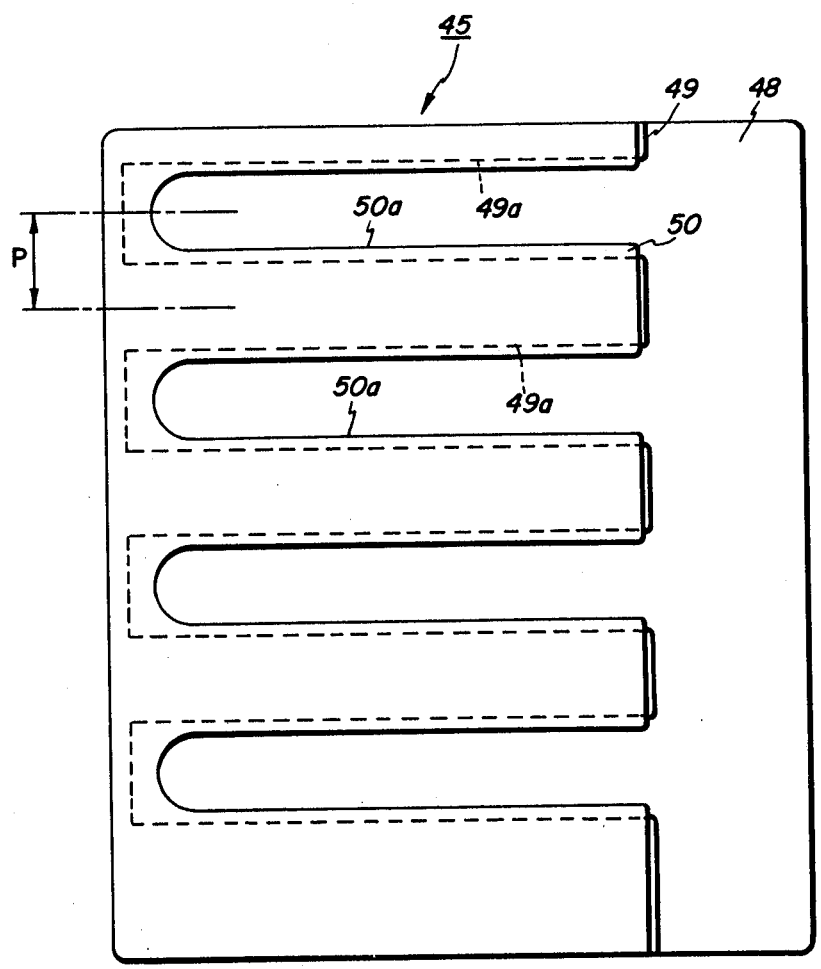
FIG. 4 is a plan view of the transparent over-lay.

The over-lay 45 is configurated as shown in FIG. 4 and consisting of a base 48, an intermediate sheet 49, an upper sheet 50 each of which is made transparent. Each of the intermediate sheet 49 and the upper sheet 50 has traverse recesses 49a and 50a respectively at twice the predetermined distance corresponding to every other destination column 22 in the order form 20. Of recesses 49a and 50a, the recesses 49a of the intermediate sheet 49 is slightly larger and insertion slits are provided between the base 48 and the upper sheet 50 by the intermediate sheet recesses 49a into which the supplemental documents 26 of the order form 20 can be inserted by being separated along the perforated line.

After the insertion of the supplemental documents 26 respectively into the insertion slits in the over-lay 45, the order form 20 is placed on the over-lay 45 so that the destination columns 1, 2, 3 and 4 are situated between each of the supplemental documents 26 inserted in the over-lay 45 and the reproduction is effected. In this case, the copy forms 30 are placed in a tray (not shown) of the reproduction machine.

Then, the contents of the destination columns 22 numbered with 1, 2, 3 and 4 of the order form 20 are reproduced on the destination columns 32 of the copy form 30 and, at the same time, the contents of the supplemental documents 26 are also duplicated each attached to respective destination columns 22. Next, the original is displaced by the predetermined distance and reproduced again and the destination columns 22 numbered as 5, 6, 7 and 8 of the order form 20 are reproduced in the same manner.

In FIG. 5 and subsequent figures, is shown an original transfer device 47 which causes the original document to reciprocate for the predetermined distance between each of the destination columns of the original document 20. A moving cover 62 having a fixture 61 for the original document holding device 46 secured therewith is adapted to move along guide pipes 63 and 64. Transfer position control 65 is incorporated within the cover 62. The slide member 66 of the control is slideably supported to one guide pipe 63 and the member 66 supports in a loose engagement a shaft 68 which is biased by a spring 67 toward the other guide pipe 64. The shaft 68 receives a roller 69 in a rolling contact with the guide pipe 64. The guide pipe 64 has two notches 70 for engagement with the roller 69 at the predetermined distance between the destination columns 22 of the order form 20. A handle 71 is attached to the top of the cover 62.

By manipulating the handle reciprocally, the original transfer device 47 is caused to reciprocate by way of the cover 62 over a distance corresponding to the predetermined distance P, where a rattle resulting from the slide member 66 and the roller 69 are absorbed in the spring 67.

While the original transfer device 47 can be manually reciprocated by gripping the handle 71, automatic control is preferred. This is accomplished by providing an additional shaft 72 to which is mounted a spring 73, one end of a crank 74 and a stopper-controlled switch 75 that locks caught by a stopper when depressed and returns released from the stopper when further depressed. The crank 74 is secured at the other end thereof to the cover 62 and the distance from the rotational axis of the crank 74 is suitably adjusted to the stroke between the notches 70. In this embodiment, the roller 76 is mounted on the side of the cover 62.

Since the driving force for reciprocating the cover 62 is thus dependent on the resilience of the spring 73 and kept constant, rattles that may result during manual operation are kept to a minimum.

Frame lines for each column in the reception card 20 may be printed in a color for which electrophotosensitive materials are insensitive, or printed in a color being capable of reproduction if the copying paper contains no printed frame lines.

According to the present invention constructed as described above, copies can be reproduced efficiently from an original document such as the order form 20 for circulation to each department requiring a copy. Also, order disposing jobs can be simplified after the reception of orders since the copy can be easily reproduced in such a manner that each of the columns, for example, destination columns 22 arranged at predetermined distances in an original document is attached with other columns, for example, the supplemental documents 26.

Obviously many modifications and variations of the present invention are possible in light of the above teachings. In particular, the order form 20 and the supplemental documents may be of any suitable configuration to carry out a desired task. It is therefore to be understood that within the scope of the appended claims, the invention may be practiced otherwise than as specifically described.

What is claimed is:

1. For use with a reproduction device having an image receiving station, apparatus for producing copies of portions of an original document containing a tabular arrangement of eye-readable information bearing sections, alike information in each row being separated by the same predetermined distance and at least one selectively positioned supplemental document which masks the portion of said original document not reproduced comprising:
    means having an image receiving station for producing copies of said original document and said supplemental document;
    a holder for positioning said original document into operative association with said image receiving station;
    a transparent overlay having insertion slits placed at desired intervals for accepting and positioning said supplemental document, said overlay positioned between said holder and said image receiving station for placing said supplemental document in a position to be reproduced while preventing the portion of said original document masked by said supplemental document from being reproduced; and
    means for moving said holder in a reciprocating motion to place said supplemental document and said original document in a first relative position during a first copy cycle and to place said supplemental document and said original document in a second relative position during a second copy cycle.

2. The apparatus of claim 1 wherein said moving means remains operative until a desired number of first and second copy cycles have been completed.

3. The apparatus of claim 1 further comprising said original document and said supplemental document.

4. The apparatus of claim 1 wherein said insertion slits are positioned such that said supplemental documents mask alternate rows of alike information on said form.

5. The apparatus of claim 4 wherein said moving means moves said holder in a reciprocating motion said predetermined distance such that in said first relative position said supplemental documents mask alternate rows of alike information on said form, and in said second relative position mask the alternate rows of alike information not previously masked.

6. The apparatus of claim 5 wherein said moving means comprises:
   sliding means for moving said holder;
   means for guiding the movement of said sliding means;
   means associated with said guide means for permitting said sliding means to move said predetermined distance; and
   means for applying a reciprocating driving force to said sliding means.

7. The apparatus of claim 6 wherein said driving means includes a handle attached to said sliding means for manually reciprocating said sliding means.

8. The apparatus of claim 6 wherein said driving means includes:
   a button switch normally in a first position, said switch lockable in a second position when first depressed and returnable to said first position when depressed further; and means operatively associated with said switch for causing said sliding means to move said predetermined distance when said switch is first depressed and to return said sliding means said predetermined distance when said switch is depressed further.

* * * * *